US006431399B2

(12) United States Patent
Gabel et al.

(10) Patent No.: US 6,431,399 B2
(45) Date of Patent: Aug. 13, 2002

(54) PHARMACEUTICAL DOSING DISPENSER

(75) Inventors: Rolf-Dieter Gabel, Schwetzingen; Jörn Möckel, Dossenheim, both of (DE)

(73) Assignee: Roche Diagnostics GmbH, Mannheim (DE)

( * ) Notice: Subject to any disclaimer, the term of this patent is extended or adjusted under 35 U.S.C. 154(b) by 0 days.

(21) Appl. No.: 09/739,040

(22) Filed: Dec. 18, 2000

Related U.S. Application Data

(63) Continuation of application No. 09/239,485, filed on Jan. 28, 1999, now abandoned.

(51) Int. Cl.[7] .......................... B65G 59/00; B65H 3/00; G07F 11/16

(52) U.S. Cl. .......................... 221/263; 221/88; 221/92; 221/97; 221/99; 221/268

(58) Field of Search ............................ 221/88, 89, 152, 221/195, 261, 263, 268, 270, 92, 93, 97, 99

(56) References Cited

U.S. PATENT DOCUMENTS 2,436,075 A 2/1948 Orban
2,865,156 A * 12/1958 Wolfson ................. 221/263 X
3,115,992 A * 12/1963 Menolasino et al. ..... 221/263 X
3,963,456 A * 6/1976 Tsuchiya et al. ........ 221/264 X
4,101,284 A * 7/1978 Difiglio et al. ......... 221/264 X
4,763,812 A * 8/1988 Sekinoo et al. ......... 221/263 X
4,812,311 A 3/1989 Uchtman
4,958,736 A 9/1990 Urheim
4,962,580 A * 10/1990 Matsuda ................. 221/264 X
5,044,350 A * 9/1991 Iwabuchi et al. ....... 221/263 X
5,148,944 A * 9/1992 Kaufman et al. ....... 221/131 X
5,246,138 A * 9/1993 Blevins, Jr. ............. 221/263 X
5,363,984 A * 11/1994 Laird, III ................ 221/266 X
5,405,011 A * 4/1995 Haber et al. .............. 221/88 X

FOREIGN PATENT DOCUMENTS

DE 3143953 5/1983
DE 4205112 8/1993

OTHER PUBLICATIONS

Abstract for Document B1.
Abstract for Document B2.

* cited by examiner

*Primary Examiner*—Christopher P. Ellis
*Assistant Examiner*—Gene O. Crawford
(74) *Attorney, Agent, or Firm*—George W. Johnston; John P. Parise

(57) ABSTRACT

A pill dispenser allows for alternating removal of two or more solid forms of pharmaceutical medications, such as tablets, film tablets, coated tablets, or capsules. The pill dispenser has a housing, a baseplate, at least two storage containers for receiving and storing a solid form of medication, and a dosing slide. The baseplate is attached to the bottom end of the housing and has at least one ejecting opening. The storage containers are adapted for receiving and storing solid forms of medications. Each storage container has a bottom opening. A dosing slide is movably mounted between the storage containers and the baseplate and has receiving openings arranged in the dosing slide so that each of the receiving openings can be positioned under a bottom opening of a storage container and above an ejecting opening.

12 Claims, 9 Drawing Sheets

PHARMACEUTICAL DOSING DISPENSER

CROSS REFERENCE TO RELATED APPLICATIONS

This is a continuation of application Ser. No. 09/239,485 filed on Jan. 28, 1999, now abandoned.

INTRODUCTION

The present invention relates to a dosing dispenser for the alternating delivery of two or more, possibly different, solid forms of pharmaceutical substances to be taken. Examples of different solid forms include tablets, film tablets, coated tablets and/or capsules, which may differ in their quantitative and/or qualitative composition.

BACKGROUND

There are numerous examples of medicines for which, in the course of treatment, solid forms of different compositions are to be taken at different times, for example in the morning, evening or on different days. The composition of the formulation may differ with respect to the dosage of the active substances, and it is also possible that the different formulations contain completely or partially different active substances. Examples of such medicines are combinations of daytime/nighttime tablets in the area of painkillers and cough remedies, the two formulations containing partially or completely different active substances.

Also in widespread use are preparations for which different dosages of an active substance or a variety of active substances are contained in one pack. One example of this is oral contraceptives, in particular, and another is urological medicines. These packs may be both so-called starter packs, with which a switch to the next highest dose is made after a few days, or monthly or calendar packs, with the aid of which physiological, cyclical increases in hormone levels are simulated.

Also popular are medicine packs which contain both active and placebo formulations to encourage compliance or to make it easier for the patient to take the correct dosage. As a result, in the case of contraceptives for example, tablets can be taken on a continuous daily schedule continually, although for a certain time no hormones are to be supplied (for example combination of 21 active and 7 placebo tablets—U.S. Pat. No. 4,958,736).

For other groups of active substances too, for example for the use of biphosphonates for the treatment of osteoporosis, there are treatment regimens in which even the daily variation between active and placebo formulations is envisaged (U.S. Pat. No. 4,812,311).

To encourage patient compliance, or to avoid mistakes in taking the medicine, the different tablets, (film tablets, coated tablets, capsules etc.) are sometimes produced in different colours and/or are provided with embossed markings or imprints etc. In addition, they may be arranged in "dosage rows" on blister strips and under certain circumstances are provided with numbers or indications of the day. Nevertheless, dosing errors can occur, since elderly patients, in particular, have problems with reading lettering and there are often special requirements with respect to the correct regimen for taking medicine, and to this extent instances of uncertainty can be observed among patients.

Greater certainty is offered by the so-called calendar packs, for example for contraceptives in the form of blister packs or dosage discs, on which, for example, the days of the week are marked. Dosage rows, (ascending or descending), wherein the arrangement of a certain number of tablets of the same dosage, followed by a number of tablets of the next dosage is technically still quite simple to achieve and provides some level of certainty, daily dosing regimens requiring varying administration of two or more different formulations requires something more sophisticated. In this case special arrangements of the tablets on the blister pack and indications in the form of arrows etc. are required, although this likewise cannot rule out mix-ups.

SUMMARY OF THE INVENTION

The present invention is directed to a reliable dosing dispenser with which two or more possibly different individual pharmaceutical formulations with quantitatively and/or qualitatively different compositions can be taken alternately one after the other.

The object is achieved according to the invention by the features set forth in the specification and the claims. The novel device is characterized by at least two separate storage containers for quantitatively and/or qualitatively different solid pharmaceutical substances to be taken, said storage containers which are arranged in a housing, which housing may have different forms. In the bottom of the housing there may be either a catching device or at least one ejecting opening or both for the forms of medicine to be taken. It is also possible for the catching device to be arranged outside the housing, for example in the form of a tray or similar vessel. Pharmaceutical substances may, for example, be in the form of tablets, film tablets, coated tablets and/or capsules. The ejecting opening has in this case the cross section of the largest form which the medicine takes. The cross section of the housing is preferably rectangular, oval or circular, although combinations of these shapes are also feasible, for example one side of the dosing dispenser may be rectangular, the other side may be rounded off. Other forms, such as polygonal, radial or trapezoidal housings, for example, can likewise be used.

The storage containers for the forms of medicine end proximate to a movable dosing slide, which is located above the bottom surface in the interior of the housing. This slide is constructed in to correspond with the respective housing, such as a rectangular or oval design, for example in the form of a bar or plate, or for a cylindrical housing in a circular design, as a dosage disc. It has as many receiving openings for the respective pharmaceutical substances from the storage containers as there are storage containers. The height of the dosing slide (thickness) is adapted to the height of the forms of medicine, thereby preventing accidental adding of a second form of medicine to the dose. Furthermore, preferably arranged on the dosing slide are lugs which fix an end position and secure the forms of medicine to prevent accidental ejection from the housing, as well as determine the filling and removal positions (click-stop positions).

The storage containers are elongated and preferably tubular and, depending on the form of medicine, their cross section may be round, oblong-shaped and/or elliptical. To prevent accidental emptying upwards, they may be closed at the top, for example by fitting on plugs.

According to a design variant, the storage containers may be closed at the bottom by a movably mounted plate or some other equivalent device when the dosing slide moves during emptying, in particular if three or more different forms of medicine are to be administered, and opened again during the filling operation when the dosing slide is moved back.

Preferred storage containers are those in which the different formulations are kept separately, which are filled once at the manufacturers or are designed to be exchangeable or refillable (refill pack).

The device according to the invention may also be combined with mechanical, electromechanical and/or electronic devices which a) block the removal of the next dose for a certain time, for example by means of a built-in clock or the like, and/or b) indicate the day, time of day, number, dosage or the like (by means of a day counter or a morning or evening indication) of the formulations just taken or the formulations to be taken next. In the simplest case, this may take place by inscriptions on the dosing slide which become visible in an alternating manner through an opening in the housing wall. In this example the changing of the indication takes place automatically when the dosing slide is pushed back and forth.

With the device according to the invention, the forms of medicine can be removed in a controlled sequence, with mix-ups avoided. In addition, the dosing dispenser according to the invention has the advantage that renewed filling is possible. For this purpose, if appropriate, a further slide which regulates the feeding of the forms of medicine is to be arranged in an analogous way above the storage containers.

BRIEF DESCRIPTION OF THE DRAWINGS

Preferred design variants of the dosing dispenser according to the invention are described in more detail with reference to FIGS. 1 to 6, in which.

DETAILED DESCRIPTION OF THE INVENTION

Figure 1A:
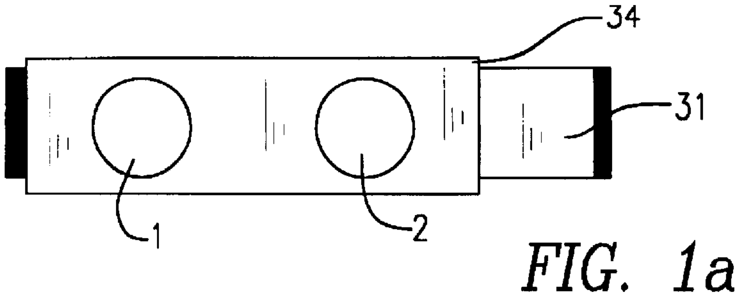
FIG. 1A shows top view of a rectangular dosing dispenser for the alternating delivery of two different formulations, having one ejecting opening between the storage containers.
Figure 1B:
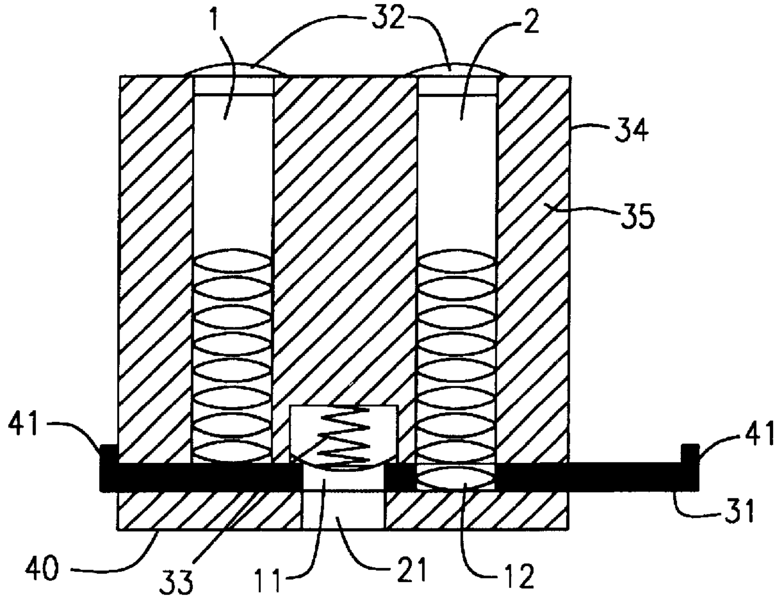
FIG. 1B shows side cross sectional view of the rectangular dosing dispenser for the alternating delivery of two different formulations, having one ejecting opening between the storage containers.
Figure 1C:
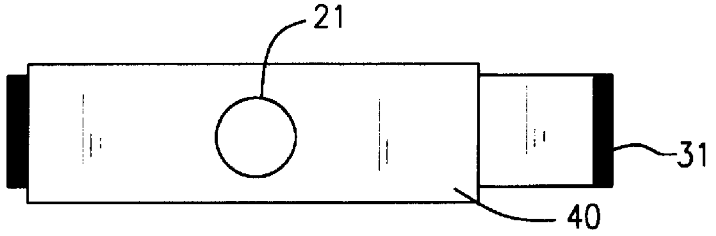
FIG. 1C shows bottom view of the rectangular dosing dispenser for the alternating delivery of two different formulations, having one ejecting opening between the storage containers.
Figure 1D:
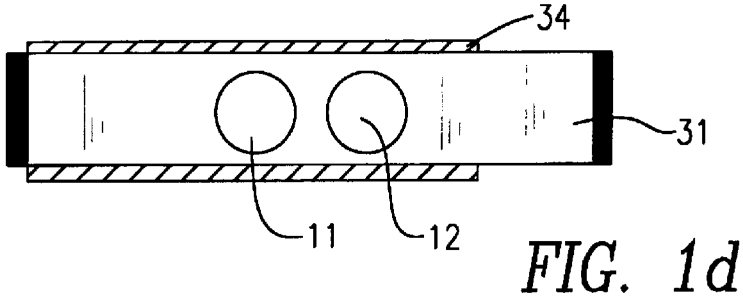
FIG. 1D shows bottom cross sectional view of the rectangular dosing dispenser for the alternating delivery of two different formulations, having one ejecting opening between the storage containers.

With reference to FIGS. 1A–1D, two forms of pharmaceutical substance are accommodated in two separate tubular storage containers 1 and 2, which are located in a common housing 34 and are linearly arranged. The cross section of the tubes is adapted to the respective form of medicine. In this arrangement, the two storage containers may have the same cross section, but may also have different cross sections. The two storage containers end in an open manner on the dosing slide 31, which is located in the same housing 34. This dosing slide 31 has two receiving openings 11 and 12 for the forms of medicine, which correspond to the cross sections of the storage containers 1 and 2 and are arranged in such a way that, in the filling position, in each case one form of medicine slides into the corresponding dosing slide 31 and, in the emptying position, it falls downwards or is ejected out of the latter. The dosing slide 31 is covered at the bottom by a baseplate 40, which has an ejecting opening 21, which corresponds to the cross section of the form of medicine or to the cross section of the largest form of medicine (in the case of different formats). By moving the dosing slide 31 back and forth, in each case a bore 11 or 12 of the slide 31 is filled, while the content of the other bore is discharged through the opening 21 in the baseplate 40.

The dosing slide 31 is secured against accidental ejection from the housing 34 by suitable lugs 41. The two filling and removal positions are also fixed by these lugs. The ejection of the forms of medicine in the emptying position may be assisted, for example, by a spring-loaded spherical cap 33, which in the emptying position protrudes slightly from above into the corresponding receiving opening of the dosing slide 31. During the movement of the dosing slide, the spherical cap 33 slides resiliently back upwards against the resistance of a spring. Such a device also supports the exact positioning of the dosing slide 31. The tubular storage containers 1 and 2 may be closed upwards against accidental emptying of the content, in the simplest case by pressing in plugs 32.

In another variant, in the upper part of the housing there is provided above the storage containers a further dosing slide, which for filling is drawn partially out of the housing and thus permits the simultaneous or successive filling of the two tubes.

Figure 2A:
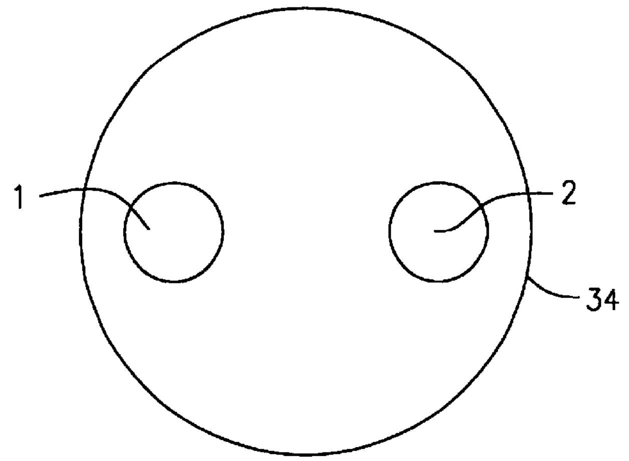
FIG. 2A shows a top view of a cylindrical dosing dispenser for the alternating delivery of two different formulations, having one ejecting opening between the storage containers.
Figure 2B:
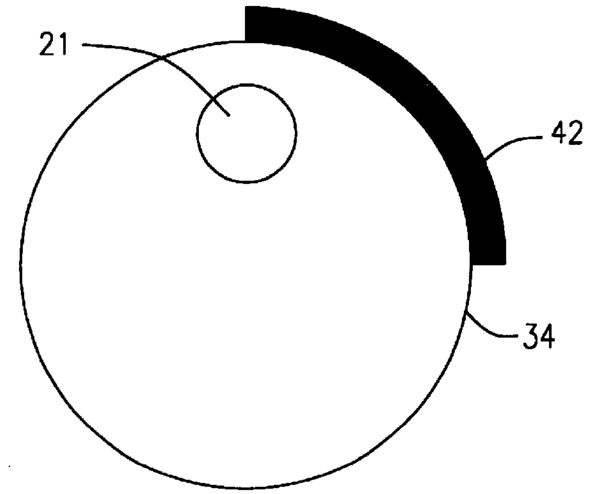
FIG. 2B shows a bottom view of a cylindrical dosing dispenser for the alternating delivery of two different formulations, having one ejecting opening between the storage containers.
Figure 2C:
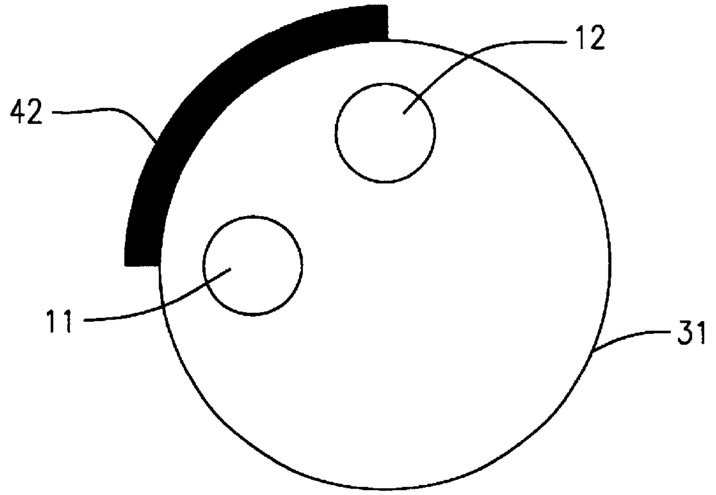
FIG. 2C shows a bottom cross sectional view of a cylindrical dosing dispenser for the alternating delivery of two different formulations, having one ejecting opening between the storage containers.

In analogy with the variant according to FIGS. 1A–1D, according to FIGS. 2A–2C a cylindrical housing 34 is used. Used as the dosing means is a circular dosage disc 31, which is likewise provided with two receiving openings 11 and 12, which correspond to the cross section of the forms of medicine to be discharged. Dosing and ejection are performed by turning the dosage disc 31 back and forth whereby receiving openings are alternately brought into communication with storage containers 1 and 2 and ejecting opening 21. If appropriate, the end positions of the disc are marked again by correspondingly protruding lugs 42 on the disc; alternatively, the dosage disc 31 may also have a greater diameter over part of its circumference, the sides of the tongue bounding the stop positions.

FIGS. 3A–3D represent an extended version of the variant according to FIGS. 1A–1D in which three storage tubes 1, 2 and 3 are accommodated in a rectangular housing 34 and the dosing slide 31 contains three receiving openings 11, 12 and 13, provided in a suitable way, for the controlled removal of different formulations, which are arranged, for example, in such a way that in the starting position the receiving openings 11 and 12 are filled. When the dosing slide 31 is then drawn out into the first click-stop position, the emptying of the receiving opening 11 takes place through ejecting opening 21. In the second click-stop position, the bore 12 is emptied through the second ejecting opening 22 and at the same time the receiving opening 13 is filled. After the dosing slide 31 has been brought back into the starting position again, the content of the bore 13 is ejected through the opening 21 in the baseplate 40. In this position of the dosing slide 31, the receiving openings 11 and 12 are simultaneously filled again, etc. In a further variant according to FIGS. 3E–3H, three ejecting openings 21, 22 and 23 are used.

As far as the arresting of the dosing slide 31 etc. is concerned, the dosing slide is secured against accidental ejection from the housing 34 by suitable lugs 41.

Figure 3A:
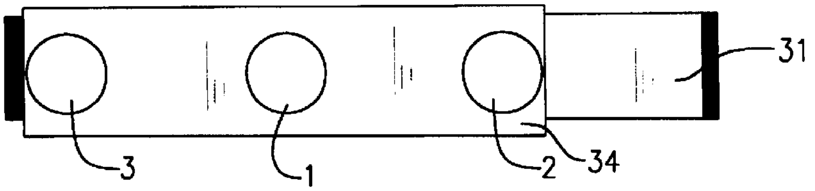
FIG. 3A shows a top view of a rectangular dosing dispenser for the alternating delivery of three different formulations, having two ejecting openings.
Figure 3B:
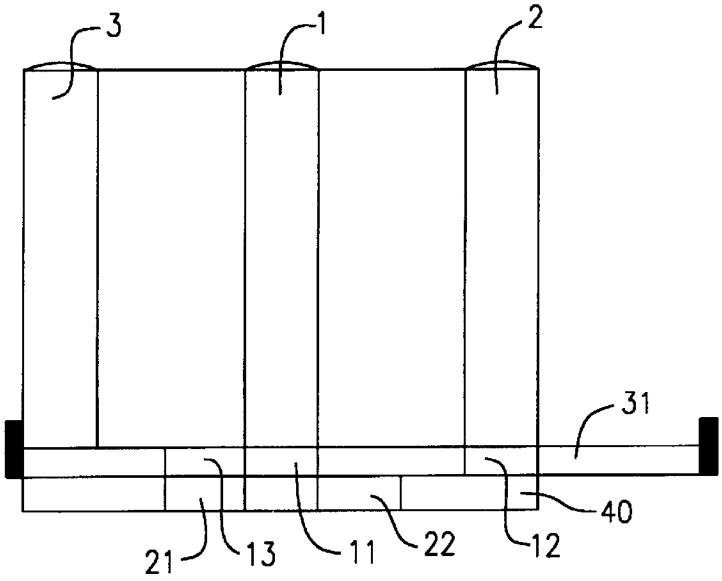
FIG. 3B shows a side view of the rectangular dosing dispenser for the alternating delivery of three different formulations, having two ejecting openings.
Figure 3C:
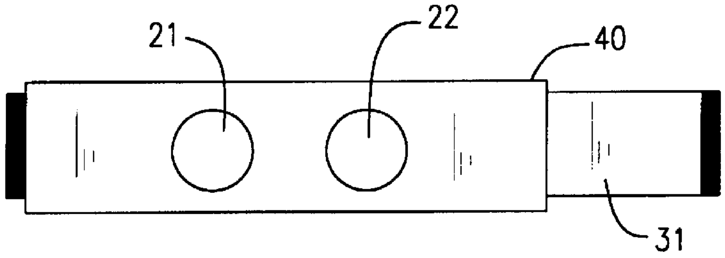
FIG. 3C shows a bottom view of the rectangular dosing dispenser for the alternating delivery of three different formulations, having two ejecting openings.
Figure 3D:
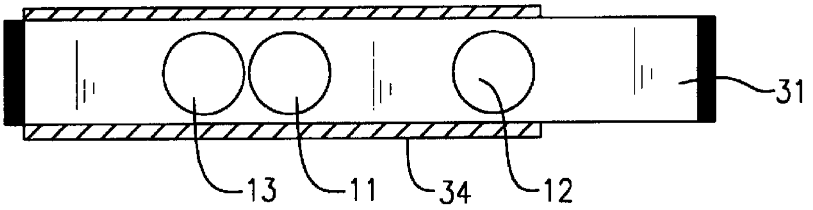
FIG. 3D shows a bottom cross sectional view of the rectangular dosing dispenser for the alternating delivery of three different formulations, having two ejecting openings.
Figure 3E:
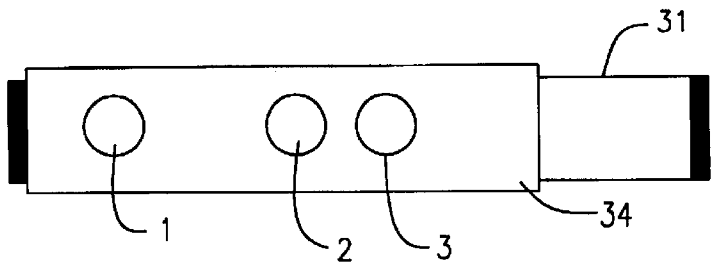
FIG. 3E shows a top view of a rectangular dosing dispenser for the alternating delivery of three different formulations, having three ejecting openings.
Figure 3F:
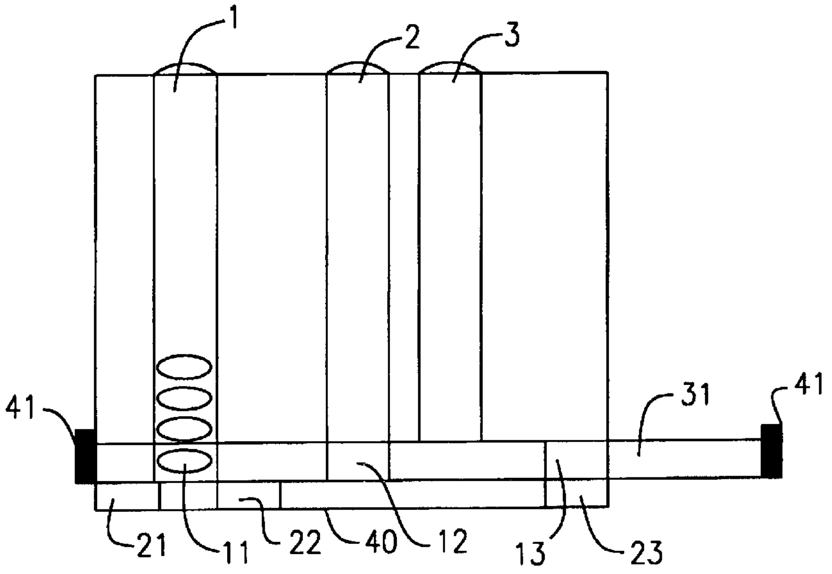
FIG. 3F shows a side view of the rectangular dosing dispenser for the alternating delivery of three different formulations, having three ejecting openings.
Figure 3G:
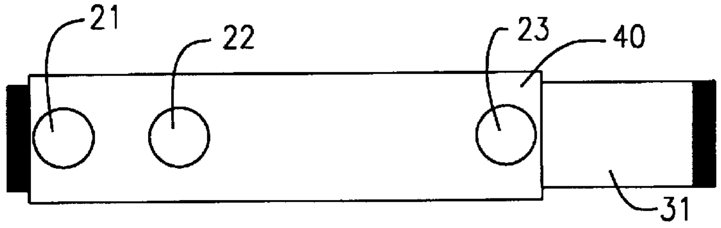
FIG. 3G shows a bottom view of the rectangular dosing dispenser for the alternating delivery of three different formulations, having three ejecting openings.
Figure 3H:
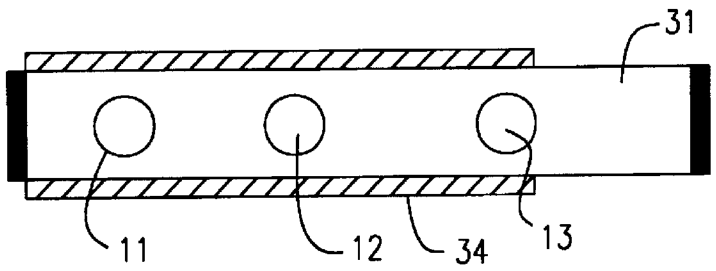
FIG. 3H shows a bottom cross sectional view of a rectangular dosing dispenser for the alternating delivery of three different formulations, having three ejecting openings.
Figure 4A:
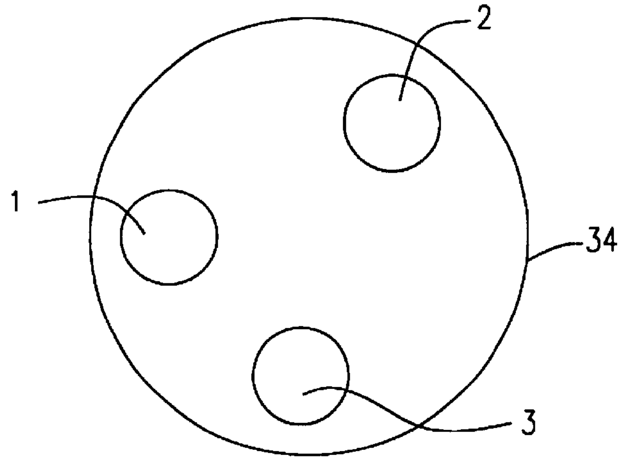
FIG. 4A shows a top view of a cylindrical dosing dispenser for the alternating delivery of three different formulations, having two ejecting openings.
Figure 4B:
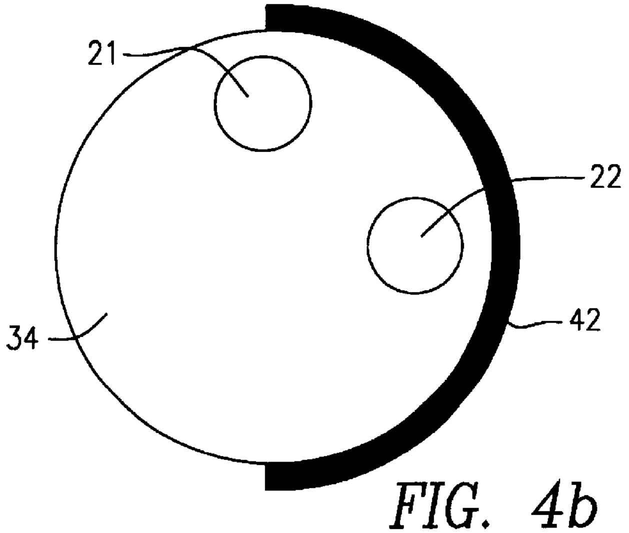
FIG. 4B shows a bottom view of a cylindrical dosing dispenser for the alternating delivery of three different formulations, having two ejecting openings.
Figure 4C:
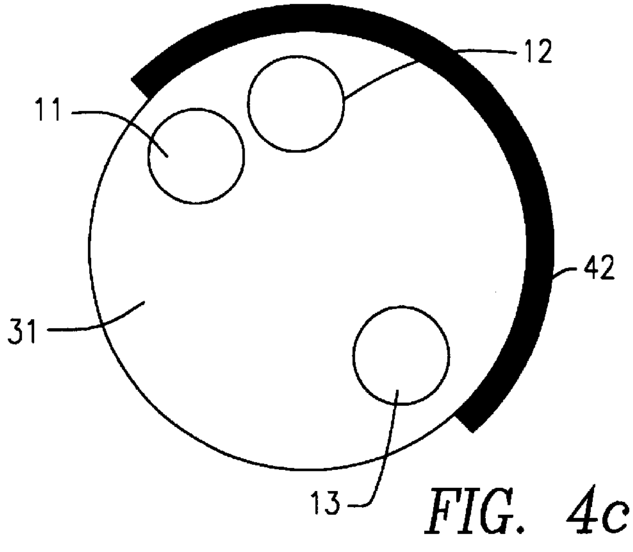
FIG. 4C shows a bottom cross sectional view of a cylindrical dosing dispenser for the alternating delivery of three different formulations, having two ejecting openings.

In FIGS. 4A–4C, the dosing dispenser for the alternating dosing of three different formulations according to the variant as shown in FIGS. 3A–3C is modified to the extent that the three tubular storage containers 1, 2 and 3 are accommodated in a cylindrical housing 34 and again a circular dosage disc 31 is used as the dosing slide. The three receiving openings 11, 12 are 13 are arranged on a circular path, but at corresponding intervals, as in the case shown by FIGS. 3A–3D.

Figure 5A:
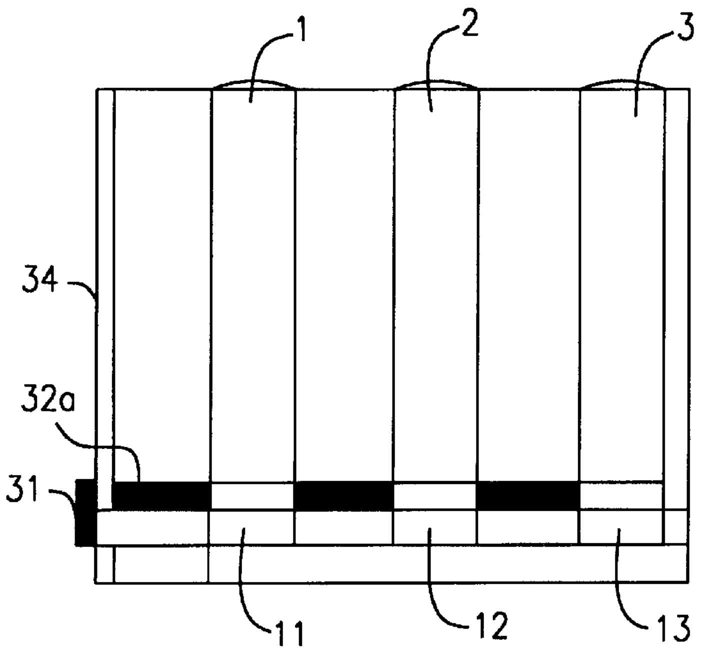
FIG. 5A shows a side view of a rectangular dosing dispenser for the alternating delivery of three different formulations, having one ejecting opening.
Figure 5B:
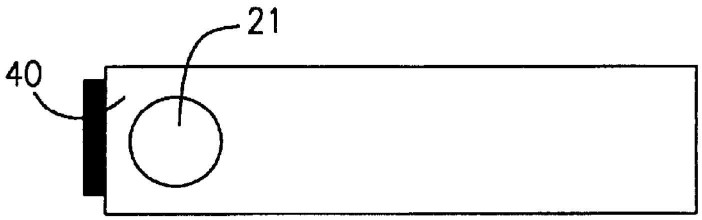
FIG. 5B shows a bottom view of a rectangular dosing dispenser for the alternating delivery of three different formulations, having one ejecting opening.
Figure 5C:
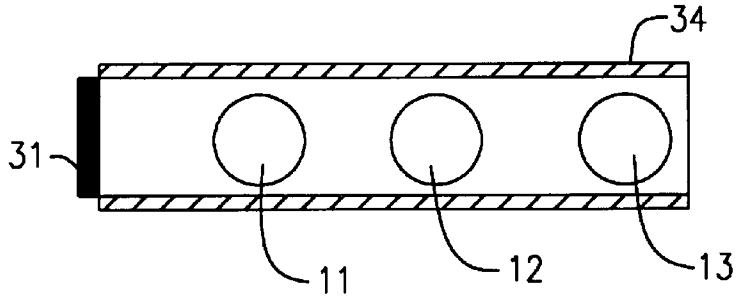
FIG. 5C shows a bottom cross sectional view of a rectangular dosing dispenser for the alternating delivery of three different formulations, having one ejecting opening.
Figure 5E:
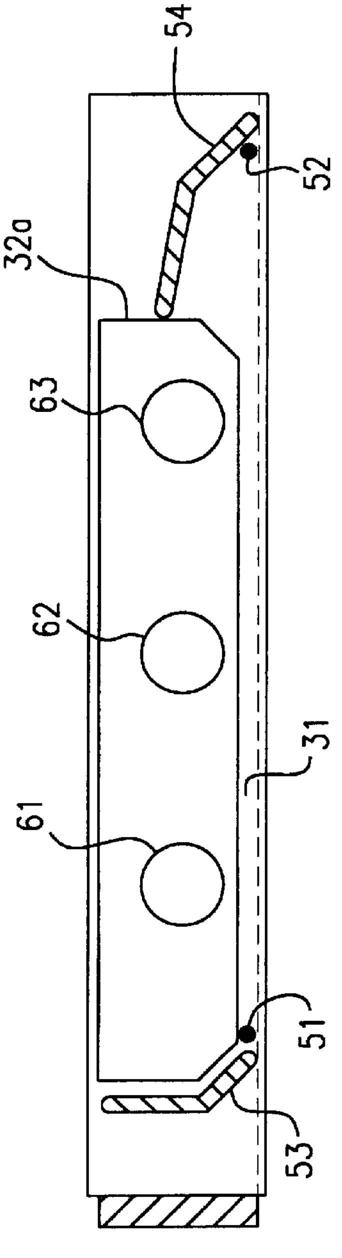
FIGS. 5D–5F schematically show means for moving closure plate 32*a* in the dosing dispenser of FIG. 5A.
Figure 5D:
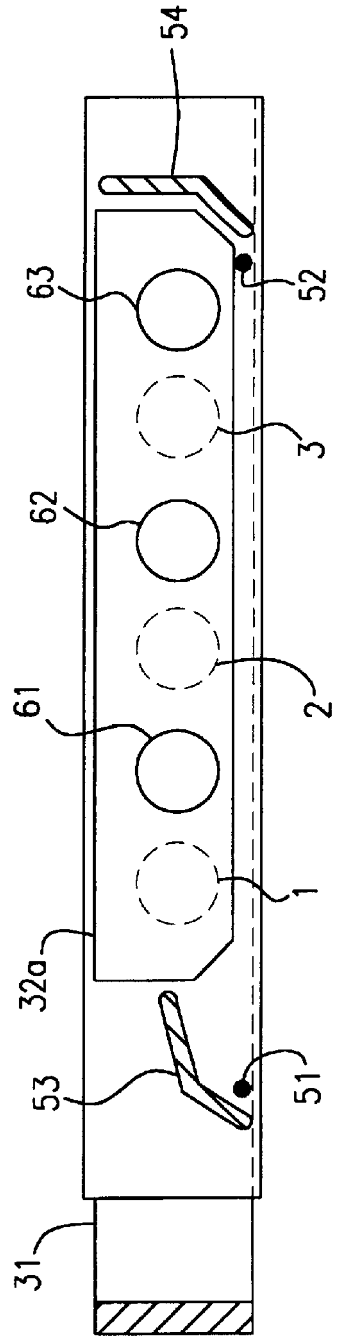
Figure 5F:
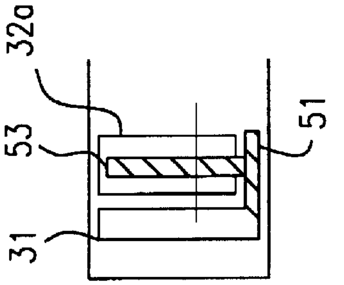
Figure 5G:
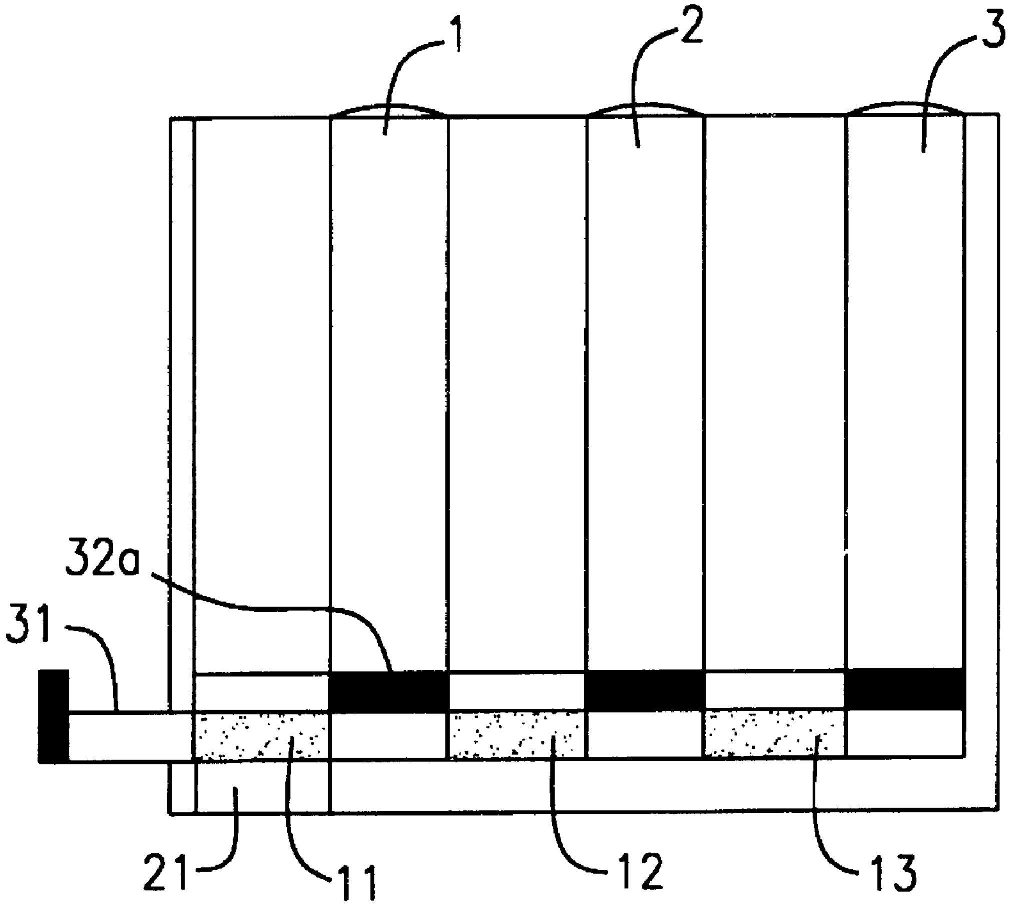
FIG. 5G shows the embodiment depicted in FIG. 5A with closure 32*a* closing the bottom ends of storage tubes 1, 2, and 3.

According to FIGS. 5A–5C, as in the case of the variant shown by FIGS. 3A–3D, three storage containers 1, 2 and 3 for the forms of medicine are arranged next to one another in a row. All three open out onto a dosing slide 31, which has three receiving openings 11, 12 and 13. By contrast with the variant 3*a*, the baseplate 40 contains only one ejecting opening 21. In the starting position, all three receiving openings 11, 12 and 13 of the dosing slide 31 are filled simultaneously with pills coming down from each of the various storage tubes 1, 2 and 3. As soon as the dosing slide 31 is moved out of this starting position in the direction of the ejecting opening 21, a movably mounted closure plate 32*a* is moved in the opposite direction by a rotatable lever 53 which is rotated by a cam 51 on the dosing slide 31. Thereby, closure plate 32*a* closes the openings of the three storage containers 1, 2 and 3 in the downward direction as shown in FIG. 5G, so that further sliding of the forms of medicine into the dosing slide 31 or a cavity possibly formed by the movement of the dosing slide is not possible. The dosing slide 31 may be drawn out of the housing 34 in three click-stopped stages, the forms of medicine being ejected one after the other at the individual stages out of the individual receiving openings 11, 12 and 13 through the opening 21.

Once all three receiving openings 11, 12 and 13 in the dosing slide 31 have been emptied, the latter is pushed back again into the starting position. During this operation as shown in FIGS. 5E and 5F, the closure plate 32 a beneath the three tubes 1, 2 and 3 is pushed back, for example by a rotatable lever 54 which is rotated by a cam 52 on the dosing slide 31. Thereby the closure plate 32 a takes the position shown in FIG. 5A on the dosing slide, and thus exposes the openings of the three tubes again. The three bores 11, 12 and 13 in the dosing slide 31 are re-filled etc.

In analogy with the variant shown in FIG. 5, a further variant is concerned with a cylindrical housing 34, in which the three storage tubes 1, 2 and 3 are arranged circularly and not linearly. The circular dosing slide 31 again contains three receiving openings 11, 12 and 13. The base contains one ejecting opening 21. As soon as the dosing slide 31 is moved out of the starting position, the three storage tubes 1, 2 and 3 are closed by means of a movable closure disc or the like, etc. Otherwise, the procedure described with respect to FIG. 5 applies.

Figure 6A:
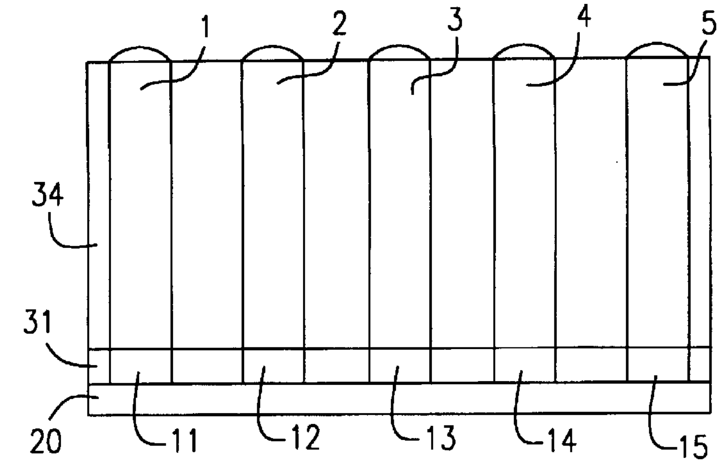
FIG. 6A shows a side view of a rectangular dosing dispenser for the alternating delivery of more than three different formulations, having a collecting tray.
Figure 6B:
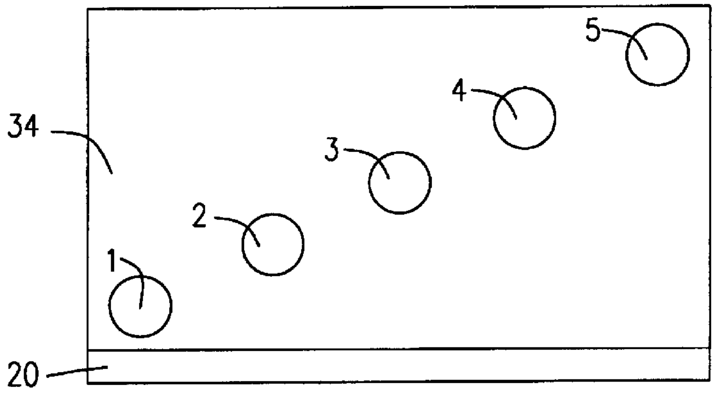
FIG. 6B shows a top view of a rectangular dosing dispenser for the alternating delivery of more than three different formulations, having a collecting tray.
Figure 6C:
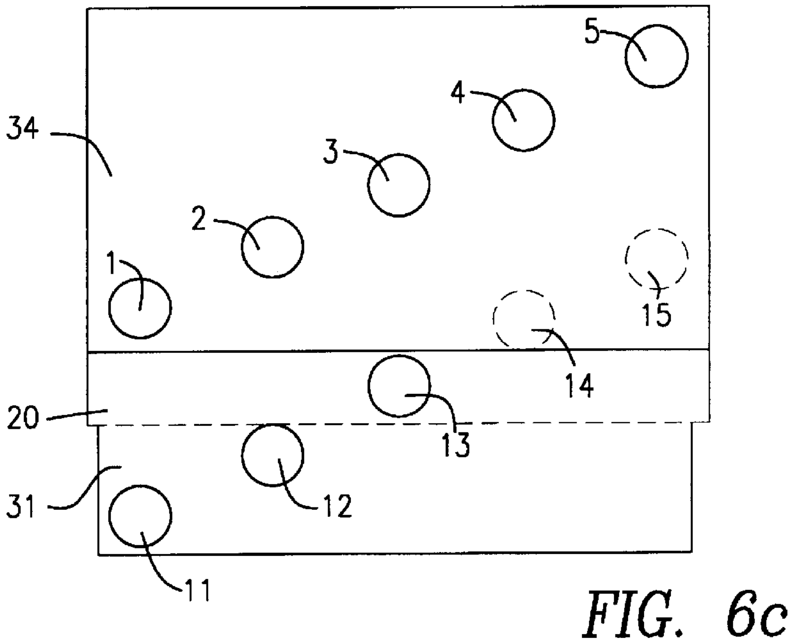
FIG. 6C shows a top view of a rectangular dosing dispenser for the alternating delivery of more than three different formulations, having a collecting tray showing one orientation of storage containers with respect to receiving openings.

FIGS. 6A–6C offer a variant for more than three different forms of medicine. In FIGS. 6A–6C, this is presented in the example of five different formulations.

The five different forms of medicine are located in five storage containers 1 to 5. These are arranged diagonally in a rectangular housing. The tubes 1 to 5 open out onto a dosing slide 31, which is in the form of a plate in which, in the starting position, the receiving openings 11 to 15 for the different forms of medicine are located exactly beneath the storage containers 1 to 5. The dosing slide 31 may be drawn out forwards from the housing 34 in a click-stop manner in five stages, the individual receiving openings 11 to 15 being emptied one after the other. The forms of medicine fall into a common catching device, for example a catching tray 20. The dosing slide 31 is subsequently pushed back into the starting position and the receiving openings 11 to 15 are filled again.

The dosing slide 31 must have an adequate length ("depth"), so that even in the fifth click-stop position, i.e. when the dosing slide 31 has been drawn out from the housing on one side to such an extent that all the receiving openings 11 to 15 are visible, unintentional further sliding of the forms of medicine out of the storage containers 1 to 5 is prevented. Alternatively, the five storage containers may also be closed by a closureplate **32*a* between the lower end of the containers and the dosing slide 31 as soon as the dosing slide 31** is removed from the starting position.

The invention is not restricted to the exemplary embodiments described here. In particular, for example, two or more tubes per removal station are also possible.

List of reference numerals

| | |
|---|---|
| 1 = | storage container for form of medicine 1 |
| 2 = | storage container for form of medicine 2 |
| 3 = | storage container for form of medicine 3 |
| 4 = | storage container for form of medicine 4 |
| 5 = | storage container for form of medicine 5 |
| n = | storage container for form of medicine n |
| 11 = | receiving opening for form of medicine 1 in the dosing slide |
| 12 = | receiving opening for form of medicine 2 in the dosing slide |
| 13 = | receiving opening for form of medicine 3 in the dosing slide |
| 14 = | receiving opening for form of medicine 4 in the dosing slide |
| 15 = | receiving opening for form of medicine 5 in the dosing slide |
| m = | receiving opening for form of medicine m in the dosing slide |
| 20 = | catching means |
| 21 = | ejecting opening |
| 22 = | ejecting opening |
| 23 = | ejecting opening |
| 31 = | dosing slide |
| 32 = | plugs |
| 32a = | closure for storage container |
| 33 = | spring-loaded spherical cap |
| 34 = | housing |
| 35 = | dosing dispenser |
| 40 = | baseplate |
| 41 = | lugs |
| 42 | lugs |

What is claimed is:

1. A pill dispenser comprising:

(a) a housing having a top end and a bottom end;

(b) a baseplate attached to the bottom end of said housing, said baseplate having at least one ejecting opening;

(c) at least two separate storage containers located within said housing and adapted for receiving and storing solid forms of at least two medications, each of said storage containers having a bottom opening; and (d) a dosing slide which is moveably mounted between said storage containers and said baseplate, said dosing slide having as many receiving openings for the forms of medication as there are storage containers, each of said receiving openings being adapted to receive a solid form of a medication directly from one of the storage containers when positioned under that container, said receiving openings being arranged in said dosing slide in such a way that each of them can be positioned under the bottom opening of a predetermined one of said storage containers, and also above a predetermined one of said ejecting openings of said baseplate, the disposition of the receiving openings with respect to each other being such that only one receiving opening is at a time in communication with said at least one ejecting opening.

2. The pill dispenser according to claim 1, wherein said storage containers are tubular, the cross section of each of said storage containers being adapted to the form of said solid form of medication to be contained in the storage container.

3. The pill dispenser according to claim 1 further comprising a closure plate which is movably mounted between the lower ends of said storage containers and said dosing slide, said closure plate being adapted for selectively sealing said bottom openings of said storage containers and thereby preventing any solid medication form from sliding out of any of the storage containers and entering into one of said receiving openings.

4. The pill dispenser according to claim 1, wherein the dosing slide is shaped to correspond to the shape of said housing and the thickness of said dosing slide and size of said receiving opening in said slide are capable of accommodating said solid form of medication singularly.

5. The pill dispenser according to claim 1, wherein the size of the ejecting opening corresponds to the cross section of the largest form of medication to be contained in said storage containers.

6. The pill dispenser according to claim 1 comprising two storage containers in said housing with an ejecting opening facing a space between the storage containers.

7. The pill dispenser according to claim 1, wherein three storage containers are arranged at unequal intervals within said housing, said baseplate having an edge region and three ejecting openings, two of which are located in the edge regions of said base plate.

8. The pill dispenser according to claim 1 comprising at least five storage containers in said housing with an ejecting opening facing a space between the storage containers.

9. The pill dispenser according to claim 1 comprising three storage containers spaced at equal intervals within the housing, the baseplate having two ejecting openings.

10. The pill dispenser according to claim 9, wherein said housing is cylindrical and said ejecting openings are located in edge regions of said base plate.

11. A pill dispenser comprising:

(a) a housing having a top end and a bottom end;

(b) a baseplate attached to the bottom end of said housing said baseplate having three ejecting openings;

(c) at least three storage containers located within said housing, said storage containers being spaced at unequal intervals within said housing and being capable of receiving and storing a solid form of a medication and said storage containers each having an opening; and (d) a dosing slide moveably mounted between said housing and said baseplate, said dosing slide having at least one receiving opening wherein moving said dosing slide positions at least one receiving opening to alternately communicate with at least one storage container and at least one ejecting opening in said baseplate.

12. A pill dispenser comprising:

(a) a housing having a top end and a bottom end;

(b) more than three storage containers located within said housing and arranged diagonally, each of said storage containers being capable of receiving and storing a solid form of a medication and each of said storage containers having a bottom opening;

(c) a catching device located at the bottom end of said housing; and (d) a dosing slide which is movably mounted beneath the storage containers, and which has as many receiving openings for the forms of medication as there are storage containers, said receiving openings being arranged in the dosing slide in such a way that they can be placed under the storage containers, and that by moving said dosing slide, said receiving openings successively deliver one of said forms with said catching device.

* * * * *